United States Patent [19]

Halper et al.

[11] Patent Number: 5,041,697
[45] Date of Patent: Aug. 20, 1991

[54] CONDUIT SECURING MEANS FOR A LIGHTING FIXTURE

[75] Inventors: Warren Halper; W. Richard Blake, both of Hendersonville, N.C.

[73] Assignee: General Electric Company, Schenectady, N.Y.

[21] Appl. No.: 439,959

[22] Filed: Nov. 20, 1989

[51] Int. Cl.[5] .............................................. H02G 3/18
[52] U.S. Cl. .................................. 174/65 R; 361/356; 361/428
[58] Field of Search ............ 174/65 R; 361/331, 334, 361/356, 364, 372, 380, 392, 428

[56] References Cited

U.S. PATENT DOCUMENTS

| | | | |
|---|---|---|---|
| 4,213,013 | 7/1980 | Perna | 361/428 |
| 4,449,015 | 5/1984 | Hotchkiss | 174/138 F |
| 4,459,429 | 7/1984 | Docimo | 174/65 R |
| 4,775,122 | 10/1988 | McClymont | 174/65 R |
| 4,927,984 | 5/1990 | Meislitzer | 174/65 R |

FOREIGN PATENT DOCUMENTS

| | | | |
|---|---|---|---|
| 564946 | 3/1958 | Belgium | 174/65 R |
| 2423233 | 11/1975 | Fed. Rep. of Germany | 174/65 R |

OTHER PUBLICATIONS

Electrical Construction & Maintenance, 7/59, p. 165, All-Steel Equipment Co. Inc., Aurora, Ill.

*Primary Examiner*—Gerald P. Tolin
*Attorney, Agent, or Firm*—George E. Hawranko; Stanley C. Corwin; Fred Jacob

[57] ABSTRACT

This lighting fixture enclosure comprises a back housing and an adjacent front housing separable from the back housing. The back housing includes a base; and the front housing includes a cavity in front of the base and a wall partially surrounding the cavity and terminating in a free end adjacent the base. The back housing includes a cradle on said base for receiving a peripheral portion of one end of a wire feed-through conduit. The front housing includes a notch in the free end of said wall for receiving another peripheral portion of the conduit. A projecting leg on said front-housing wall receives clamping means which, upon operation, forces the front housing toward the back-housing base, loading the leg in a bending mode, and also clamping the conduit end between said cradle and the wall portion bordering the notch.

4 Claims, 2 Drawing Sheets

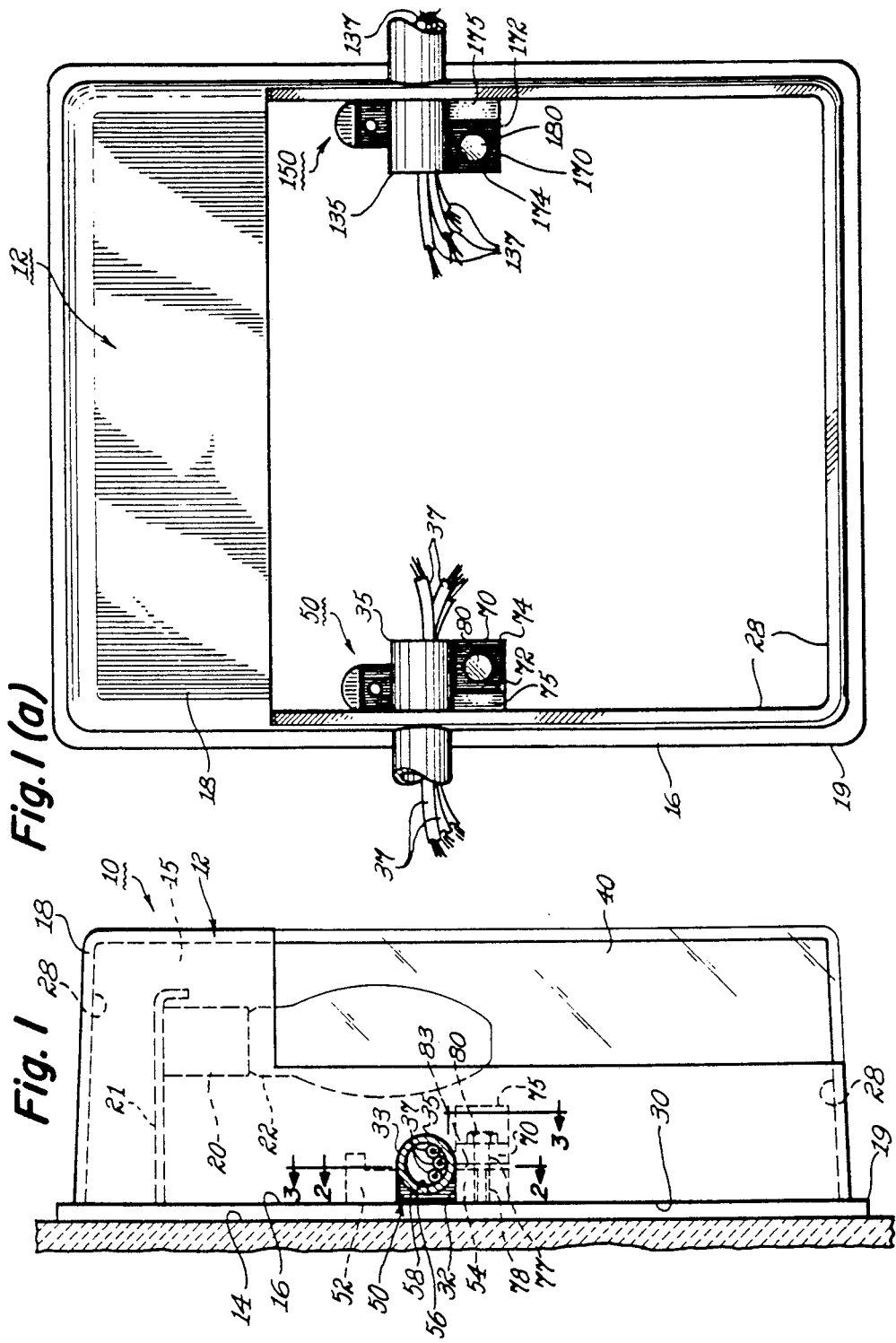

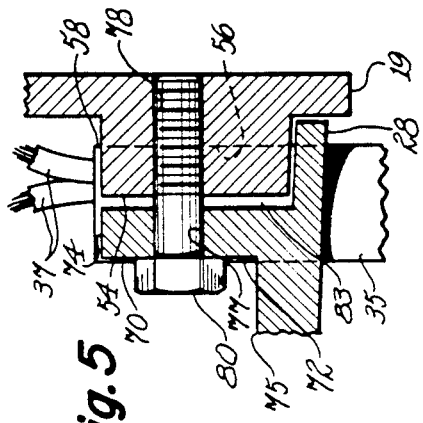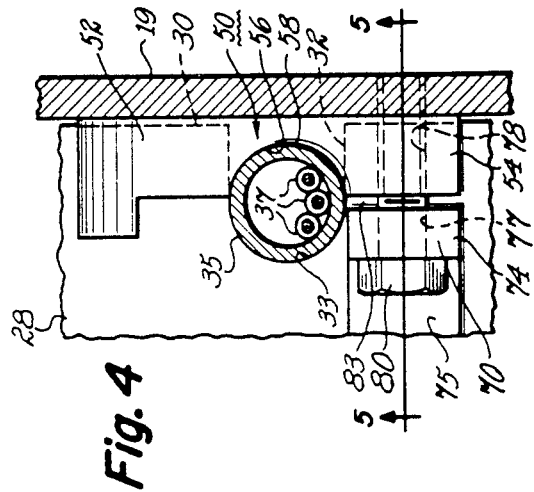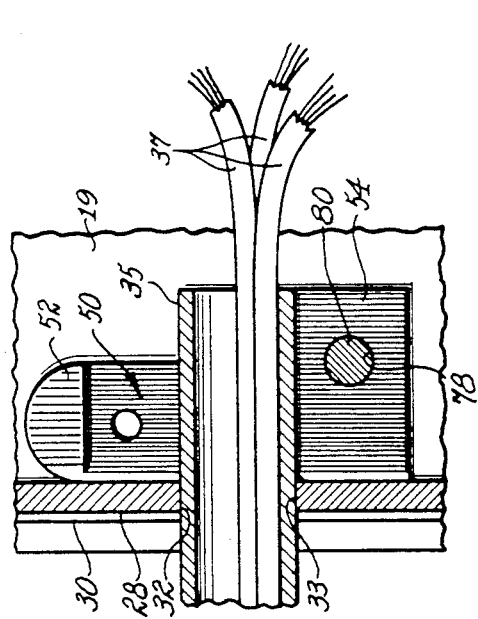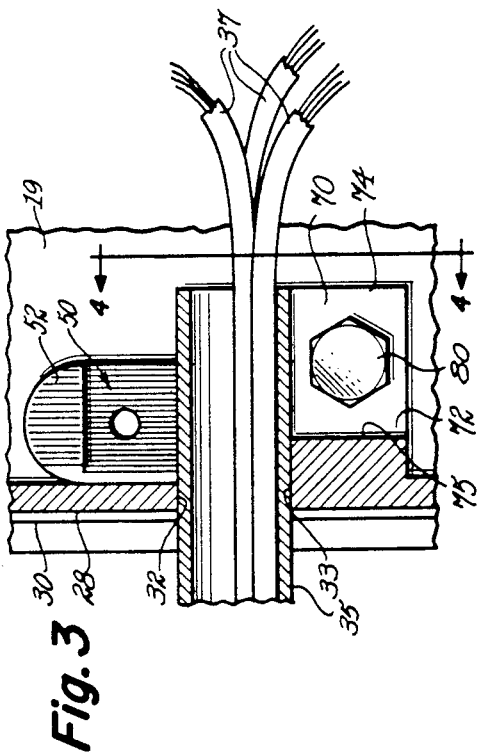

CONDUIT SECURING MEANS FOR A LIGHTING FIXTURE

BACKGROUND

This invention relates to a lighting fixture and, more particularly, to means for securing one end of a wire feed through conduit within an enclosure of the lighting fixture.

Typically, the conduit entrance into a lighting fixture comprises means forming an internally threaded opening in a wall of the fixture, and this opening receives an end of the conduit having external threads that mesh with the internal threads of the opening. Typically, the conduit end is a portion of a conduit that runs along a wall and is fixed to the wall, providing an enclosure for wires entering the lighting fixture and other wires as well. In order to enable the conduit end to be threaded by rotation into the internal threads of the fixture wall, it is usually necessary to provide a union for joining the conduit end to the rest of the conduit. The union allows the conduit end to be rotated independently of the remainder of the conduit and thus to be threaded into the fixture, following which the union can be tightened to effectively join the end of the conduit to the remainder of the conduit.

OBJECTS

An object of the present invention is to support the conduit end within a lighting fixture in such a manner as to eliminate the need for threading the conduit into the fixture end and also the need for threads on the conduit end, as well as the need for the above-described union in the conduit.

Another object is to provide means for effectively securing the conduit end within the fixture that lends itself to a simple installation process for the conduit.

SUMMARY

In carrying out the invention in one form, we provide a lighting fixture enclosure comprising a back housing and a front housing adjacent the back housing and separable therefrom. The back housing comprises a base, and the front housing includes a cavity in front of the base and a wall bounding the cavity and terminating adjacent the base in a free end. A cradle on the front housing defines at said free end a notch that is adapted to receive one end of a wire feed through conduit. For securing said one end of the conduit within the enclosure, we provide conduit-securing means that comprises the following: (1) a cradle on the back housing comprising two spaced apart portions projecting from the base and a recess located between said spaced apart portions for receiving a first portion of the periphery of the conduit, (2) the cradle on the front housing with said notch located to receive a second portion of the conduit periphery, (3) an elongated leg having a proximate end and a clamping region spaced therefrom, (4) means joining the proximate end to said front-housing wall in a location where the clamping region of the leg is in proximity with one of the projecting portions of the cradle on the back housing, and (5) clamping means between the clamping region of the leg and said one projecting portion for applying forces to the leg that load the leg in a bending mode and are adapted to force the cradle on the front housing into clamping relationship with said second portion of the conduit periphery.

BRIEF DESCRIPTION OF FIGURES

For a better understanding of the invention, reference may be had to the following detailed description taken in conjunction with the accompanying drawings, wherein:

FIG. 1 is a side elevational view of a lighting fixture embodying one form of the invention. A wire feed-through conduit is shown entering the fixture and in section FIG. 1a is a front view of the fixture of FIG. 1, except with certain parts of the fixture removed to better illustrate the conduit securing means.

FIG. 2 is an enlarged sectional view along the line 2—2 of FIG. 1.

FIG. 3 is an enlarged sectional view along the line 3—3 of FIG. 1.

FIG. 4 is an end view of the structure of FIG. 3 as seen from the line 4—4 of FIG. 3.

FIG. 5 is a sectional view along the line 5—5 of FIG. 4.

DETAILED DESCRIPTION OF EMBODIMENT

Referring now to FIG. 1, there is shown a lighting fixture 10 comprising an enclosure 12 that is attached to a wall 14. Enclosure 12 comprises two separable housing portions, one referred to herein as a back housing 16 and the other as a front housing 18. In one form of the invention, these housings are of die cast aluminum. The back housing 16 comprises a base portion 19 that is suitably attached to the wall 14. Mounted on this base portion is a conventional socket 20 that supports a suitable lamp 22 and a frame 21 that supports the socket on the base portion.

The front housing 18 is a hollow structure including a cavity 15 in which the lamp 22 is located. The cavity 15 is bounded by a wall 28 that extends toward the base 19 and terminates in a free end 30 containing a notch 32. The portion 33 of the wall 28 bordering the notch 32 may be thought of as a cradle on the front housing, and is referred to hereinafter as a second cradle. The notch 32, which is semi-circular at its inner end, provides an opening through the front housing wall 28 for receiving a cylindrical wire feed-through conduit 35. Conduit 35 encloses insulated wires 37 that extend therethrough and are connected at their inner ends in a conventional manner (not shown) with electrical components within the cavity 15 and socket 20.

The front housing also includes a refractor 40 of a suitable plastic through which light from the lamp 22 passes to the exterior. A reflector (not shown) of conventional form is carried by the front housing and acts to reflect light from the lamp 22 through the refractor 40.

For securing the end of conduit 35 within the enclosure 12, we provide securing means that comprises a first cradle 50 that is fixed to the base portion 19 of the back housing. This cradle 50 comprises two spaced-apart portions 52 and 54 projecting from the base 19 and a recess 56 of semi-cylindrical form located between these portions 52 and 54. Recess 56 is aligned with notch 32 in the wall of the front housing and receives a first portion 58 of the circular periphery of the cylindrical conduit 35.

The cradle 33 on the front housing, which is constituted by the wall portion that borders the notch 32, serves as a second cradle for receiving the conduit 35. This second cradle receives a second portion of the circular periphery of the cylindrical conduit 35 that is generally diametrically opposed to the portion of the conduit periphery received in the recess of the first cradle 50.

The two cradles 50 and 33 when urged together, tightly embrace the conduit 35 at its diametrically opposed sides, thus clamping the conduit to the enclosure 12. For urging the two cradles together, I utilize the same securing means that is used for holding the back and front housings 16 and 18 together. This securing means comprises an elongated leg 70 that has a proximate end 72 and a distal end 74. The proximate end 72 is joined to the wall 28 of the front housing by a flange 75 that is integral with the wall 28. The leg projects inwardly from wall 28 in the same direction as the central longitudinal axis of the conduit runs. The leg 70 is so located that its distal end 74 substantially registers with one of the projecting portions 54 of the cradle on the back housing. There is a hole 77 in this distal end that aligns with a threaded hole 78 in the projecting end portion 54. A screw 80, preferably of the self-threading type, extends through the hole 77 and has one end threaded in the hole 78. When this screw 80 is tightened, it develops clamping force that urges the front housing toward the base 16 of the back housing and also urges cradle 50 and 33 into firm engagement with the conduit 35 at its diametrically opposed sides.

The leg 70 is so located that the two cradles 50 and 33 solidly engage the conduit 35 before the leg 70 engages the projecting portion 54 of the cradle 50, i.e., while there is still a clearance space 83 between leg 70 and projecting portion 54. Further tightening of the screw 80 loads the leg 70 in bending and develops a progressively increasing clamping force on the conduit. Clamping energy is, in effect, stored in the leg 70 as it is bent by tightening of the screw 80.

Referring to the front view of FIG. 1a, which shows refractor 40 and lamp 22 removed from the fixture, the enclosure 12 has conduit-securing means at two of its sides. The conduit-securing means described in detail hereinabove is located at the left hand side of the enclosure as seen in FIG. 1a; and substantially identical conduit-securing means is located at the opposite side of the enclosure for receiving the end of a second conduit 135 that enters the enclosure through this opposite side. The conduit-securing means at the right hand side of the enclosure clamps the end of the conduit 135 in the same manner as the first conduit-securing means clamps its conduit 35. Corresponding parts of the two securing means are designated with corresponding reference numerals except that the prefix 1 is used for the right hand securing means.

With both of these securing means, when the clamping means (80 or 180) is tightened, it urges the front housing 18 toward the back housing 16 and acts to hold these two housings together. In other words, the same fastening means is able to perform the dual function of clamping the two enclosure components 16 and 18 together and of clamping the conduits 35 and 135 within the enclosure. Both legs 70 and 170 are loaded in bending by such clamping action and thus store clamping energy.

Referring still to FIG. 1a, after the conduits are clamped in place by the conduit-securing means, the lamp (22) is installed and the refractor (40) is added to complete installation of the fixture.

It is to be noted that all the wiring and electrical connections in our fixture are located in the upper portion of the fixture above the conduit entrances. Should any rain water or the like enter the enclosure at the conduit entrances, it will run down the walls of the enclosure to suitable drain openings at the bottom of the fixture, thus bypassing the wiring and electrical connections. Suitable gasketing (not shown) between the edges of the two housing portions in the upper half of the enclosure prevents any water from entering in this region. Alternatively, such gasketing can be omitted and suitable rain gutters provided in the upper half of the enclosure to direct any water entering in this region to the drain openings via paths bypassing the wiring and electrical connections.

While we have shown and described a particular embodiment of our invention, it will be obvious to those skilled in the art that various changes and modifications may be made without departing from our invention in its broader aspects; and we, therefore, intend herein to cover all such changes and modifications as fall within the true spirit and scope of our invention.

What I claim is:

1. A lighting fixture enclosure comprising:
   (a) a back housing comprising a base,
   (b) a front housing adjacent said back housing and separable therefrom, said front housing including a cavity in front of said base and a wall at least partially bounding said cavity and terminating adjacent said base in a free end,
   (c) means comprising a cradle on said front housing that defines at said free end of said front-housing wall a notch that is adapted to receive one end of a conduit for enclosing wires entering said enclosure,
   (d) means for securing said one end of the conduit within said enclosure comprising:
      (i) a cradle on said back housing comprising two spaced-apart portions projecting from said base and a recess located between said spaced-apart projecting portions for receiving a first portion of the periphery of said conduit,
      (ii) said cradle on said front housing positioned with said notch located to receive a second portion of the periphery of said conduit that is generally diametrically opposed to said first peripheral portion,
      (iii) an elongated leg having a proximate end and a clamping region spaced therefrom,
      (iv) means joining said proximate end of the leg to said wall of the front housing in a location where said clamping region of the leg is in proximity with one of said projecting portions of the cradle on said back housing, and
      (v) clamping means between the clamping region of said leg and said one projecting portion of the back-housing cradle for applying to said leg forces that load said leg in a bending mode and are adapted to force said cradle on the front housing into clamping relationship with said second portion of the periphery of said conduit.

2. The lighting fixture enclosure of claim 1 in which said clamping means upon loading said leg in a bending mode also serves to hold said front housing in assembled relationship with said back housing.

3. A lighting fixture enclosure as defined in claim 1 and further including:
   (a) means comprising a second cradle on housing that defines at the free end of said front-housing wall in a location spaced from said first notch a second notch that is adapted to receive one end of a second conduit for enclosing wires entering said enclosure,
(b) second conduit-securing means for securing within said enclosure said one end of the second conduit comprising:
   (i) a second cradle on said back housing comprising two spaced-apart portions projecting from said base and an additional recess located between the latter spaced-apart projecting portions for receiving a first portion of the periphery of said second conduit,
   (ii) said second cradle on said front housing positioned with said second notch located to receive a second portion of the periphery of said second conduit that is generally diametrically opposed to said first peripheral portion,
   (iii) a second elongated leg having a proximate end and a clamping region spaced therefrom,
   (iv) means joining said proximate end of the second leg to said wall of the front housing in a location where said clamping region of the second leg is in proximity with one of said projecting portions of the second cradle on said back housing, and
   (v) clamping means between the clamping region of said second leg and said one projecting portion of the second back-housing cradle for applying to said second leg forces that load said second leg in a bending mode and are adapted to force said second cradle on the front housing into clamping relationship with said second portion of the periphery of said second conduit.

4. The enclosure of claim 1 in which:
(a) operation of said clamping means: (i) causes said cradles to solidly embrace said conduit and thereby clamp said conduit to said back housing and (ii) moves said clamping region of the leg toward said one projecting portion of the back-housing cradle, and
(b) upon operation of said clamping means, said cradles solidly embrace said conduit before said leg reaches the limit of its movement toward said one projecting portion of the back-housing cradle, thus causing a bending force to be exerted on said leg when said clamping means is further operated.

* * * * *